United States Patent [19]

Uemura

[11] Patent Number: 4,850,547
[45] Date of Patent: Jul. 25, 1989

[54] MAGNETIC TAPE CASSETTE
[75] Inventor: Noboru Uemura, Odawara, Japan
[73] Assignee: TDK Corporation, Tokyo, Japan
[21] Appl. No.: 98,115
[22] Filed: Sep. 17, 1987
[30] Foreign Application Priority Data
Oct. 6, 1986 [JP] Japan .................. 61-152516[U]
[51] Int. Cl.⁴ .............................. G11B 23/00
[52] U.S. Cl. .................... 242/198; 242/199; D14/121
[58] Field of Search ............... 242/197–200; 360/132; D14/6

[56] References Cited
U.S. PATENT DOCUMENTS

D. 262,877 2/1982 Yoshizawa ..................... D14/11
3,622,102 11/1971 Fox ........................... 242/199
4,757,958 7/1988 Elliot et al. ................... 242/199

*Primary Examiner*—David Werner
*Attorney, Agent, or Firm*—Seidel, Gonda, Lavorgna, Monaco

[57] ABSTRACT

In a magnetic tape cassette comprising an upper half housing section with a see-through window, a lower half housing section, a pair of hubs on which a length of magnetic tape is wound and which are rotatably fitted in between the two half housing sections, and a stopper located between one edge of the tape wound on the hubs and the upper half housing section and having pawls engageable with given points of the hubs, the stopper has a flap portion slidable along the inner side of the see-through window and which is exposed when the pawls are engaged with the hubs. The stopper is slidable perpendicularly to the axes of rotation of the hubs. It is colored as classified by the grade, use, or type of the magnetic tape involved. Its exposed area visible through the see-through window is at a maximum when the stopper is engaged with the hubs.

4 Claims, 2 Drawing Sheets

MAGNETIC TAPE CASSETTE

BACKGROUND OF THE INVENTION

This invention relates to a magnetic tape cassette and, more specifically, to the improvements in identifiability of the magnetic tape cassette.

Pulse-code modulation recording-reproducing units have been proposed which change acoustic and other analog signals into digital ones, such as PCM signals, and record (or reproduce) the information on a magnetic tape. A recent variety of the PCM recorder-reproducer uses a rotating head to obtain a relatively high recording density. In the PCM recorder-reproducer using a rotating head, a magnetic tape is partly pulled out of a magnetic tape cassette and is wound round a rotating drum where the rotating head is installed for recording or playback.

With the magnetic tape cassette to be used in such a PCM recorder-reproducer it is necessary to seal the magnetic tape as tightly in the cassette as possible; otherwise finger marks and dust deposit on the tape could cause dropouts of signals being reproduced. There must also be provided a large enough space inside the cassette housing for the insertion of guides along which the magnetic tape can be partly taken out for recording or reproduction.

To meet these requirements a magnetic tape cassette has been contrived which includes a slide cover located outside the lower half section of the cassette housing and adapted to slide toward and away from the front face of the cassette and also includes a front lid pivotally secured to the housing so as to turn open or cover the front face. The magnetic tape cassette of the character further incorporates a stopper having pawls engageable with the peripheries of hubs to prevent the roll of tape from loosening due to free rotation of the hubs during the storage or transportation of the cassette. The stopper, except for its pawls, is disposed to be slidable perpendicularly to the axes of rotation of the hubs between, and along, the inner surface of an opaque cover portion outside the see-through window of the upper half housing section and the edges of tape wound on the hubs, so that the pawls projecting from the inner end of the stopper come into or out of engagement with the hub peripheries.

It is customary with the cassette of the type to print information including the length, quality, and grade of the magnetic tape involved on a label and affix the label to a preselected area of the opaque front portion outside the see-through window of the cassette housing. Since the labeled area is very small (approximately 5 cm by 7 cm), the label is liable to contact with the fingers and soiling with finger marks. Another problem is that the lack of proper indication as to the length, quality, kind, and other information on the tape causes confusion among the workers during the manufacture of the cassettes.

It is an object of the present invention to provide a magnetic tape cassette on which pertinent information is easily indicated and, preferably, the grade, kind, and other data are given for easy identification.

Another object of the invention is to increase the portion of the stopper exposed to be visible through the see-through window of the upper half housing section of a magnetic tape cassette.

Still another object of the invention is to improve the production controllability and identifiability of magnetic tape cassettes through clear indication of the grade, use, type, and other pertinent information of the magnetic tape contained.

A further object of the invention is to provide a magnetic tape cassette with improved outward appearance.

SUMMARY OF THE INVENTION

According to the present invention a magnetic tape cassette is provided which comprises an upper half housing section having a see-through window, a lower half housing section, a pair of reels or hubs on which a length of magnetic tape is wound and which are rotatably fitted in between the upper and lower half housing sections, and a stopper located between one edge of the tape wound on the hubs and the upper half housing section and having pawls engageable with given points of the hubs, said stopper having a flap portion slidable along the inner side of the see-through window and which is exposed when the pawls are engaged with the hubs.

The magnetic tape cassette according to the invention, with the construction described, looks better while in storage than the conventional cassettes because of the larger exposed portion of the stopper dissimilar in color to the upper half housing section. Classification of the colors by the grades, uses, or types facilitates the production control and makes the resulting cassettes more readily identifiable than conventional ones. The exposed portion of the stopper visible through the enlarged see-through window is immune from any touch of, or rub with, the fingers or the like. Figures or patterns printed on the exposed surface will remain legible for a long time without deterioration.

The invention will now be described in more detail with reference to the drawings.

DESCRIPTION OF THE PREFERRED EMBODIMENT

Figure 1:
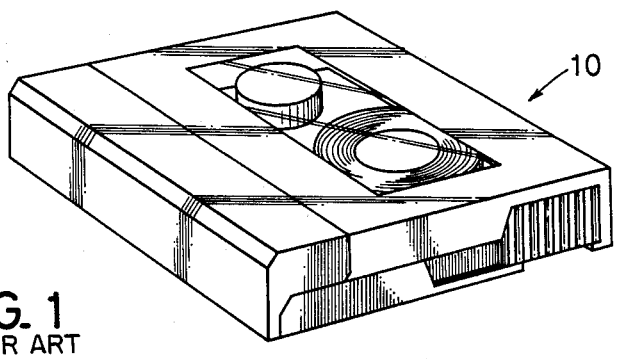
FIG. 1 is a perspective view of a conventional magnetic tape cassette.
Figure 2:
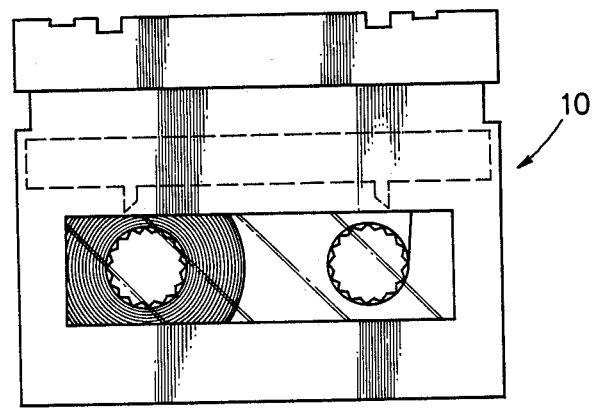
FIG. 2 is a plan view of the conventional magnetic tape cassette in use.
Figure 3:
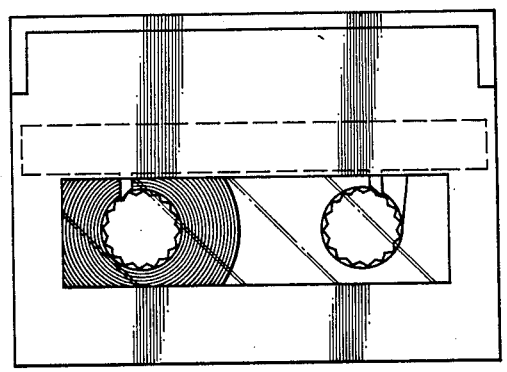
FIG. 3 is a plan view of the conventional magnetic tape cassette in storage or in transportation.
Figure 4:
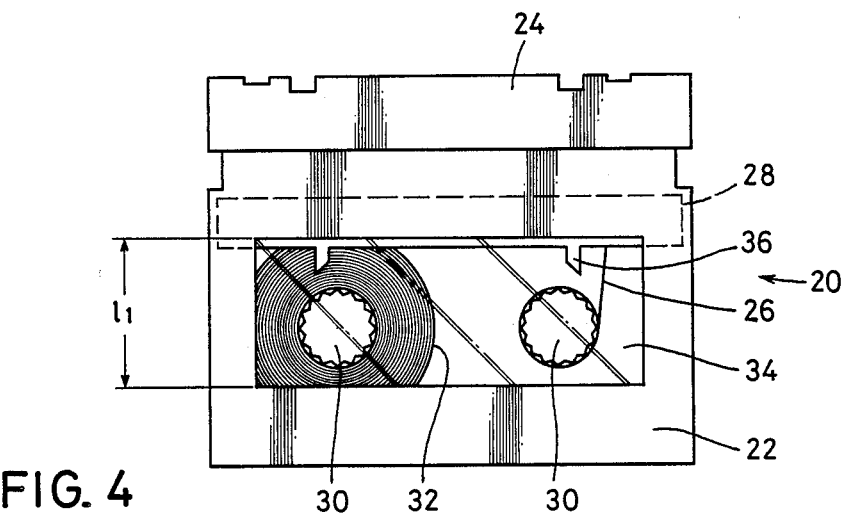
FIG. 4 is a plan view of a magnetic tape cassette of the present invention in the same state as the cassette in FIG. 2.

FIG. 4 shows, in a plan view, a magnetic tape cassette 20 of the invention in use. The general construction and functions of the magnetic tape cassette 20 are the same as those of the conventional magnetic tape cassette shown in FIG. 1 with the exception that the upper half housing section has a larger see-through window 34. As the cassette is loaded in an apparatus for magnetic recording or reproduction, a front lid 24 pivotally secured to the cassette housing to be turnable between the upper half housing section 22 and a lower half section (not shown) is turned away from the front face of the cassette, leaving a part of the magnetic tape exposed. At the same time, a slide cover (not shown) which is the same as the one designated at 12 in FIG. 1 is caused to slide backward to provide a sufficient space behind the exposed magnetic tape to admit the guides of the recorder-reproducer. In the space between the upper and lower half housing sections, there are rotatably fitted a pair of reels or hubs 30 on which a length of tape is wound. A stopper 28 is located between the roll 32 of the tape on the hubs 30 and the upper half housing section 22 so as to be slidable perpendicularly to the axes of rotation of the hubs 30 into and out of engagement with one point each of the hubs. While the magnetic tape cassette is in use, only a part of the stopper 28 and its pawls 36 adapted to engage with given points of the hubs 30 are observed through the enlarged see-through window 34.

Figure 5:
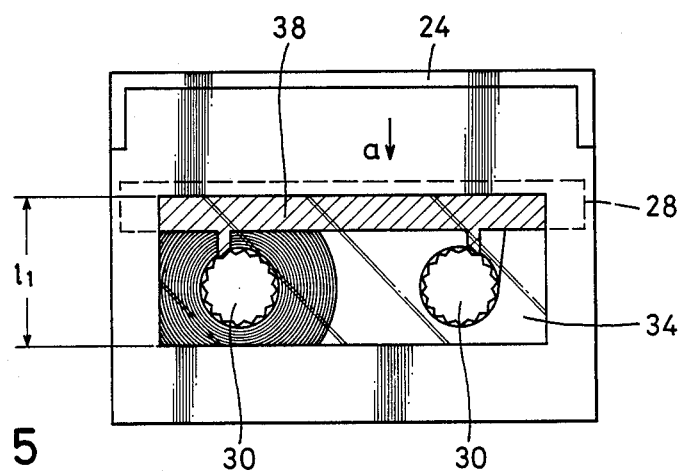
FIG. 5 is a plan view of the magnetic tape cassette of the invention in the same state as the cassette in FIG. 3.

Referring now to FIG. 5, there is shown, in a plan view, the magnetic tape cassette in storage or in transportation. In this state the front lid 24 remains closed and the stopper 28 slid in the direction a is in the stop position with its pawls 36 in mesh with corresponding teeth of the hubs 30. The shift in position of the stopper 28 by the sliding in the a direction exposes a larger portion of the stopper than heretofore, as a hatched zone 38, in the enlarged see-through window 34 having a width $l_1$. The exposed portion may, for example, be colored beforehand as an indication of the type, intended use, or grade of the tape. The color classification will facilitate the production control and make the tape easier to identify. Characters or patterns, printed on the same area, will have longer life than on the outer side of the cassette housing.

While the invention has been described in its preferred form, it is to be understood that the invention is not limited thereto but may be otherwise variously embodied without departing from the spirit and scope thereof.

What is claimed is:

1. A magnetic tape cassette comprising an upper half housing section having a see-through window, a lower half housing section, a pair of reels or hubs on which a length of magnetic tape is wound and which are rotatably fitted in between the upper and lower half housing sections, and a stopper located between one edge of the tape wound on the hubs and the upper half housing section and having pawls engagable with given points of the hubs, said stopper having a flap portion slidable along the inner side of the see-through window and said flap portion being colored to classify the grade, use, or type of magnetic tape involved and exposed or visible through the see-through window when the cassette is in a storage or transportation configuration corresponding to when the pawls are engaged with the hubs.

2. A magnetic tape cassette according to claim 1 wherein said stopper is slidable perpendicularly to the axes of rotation of said hubs.

3. A magnetic tape cassette according to claim 1 wherein the exposed area of said stopper visible through said see-through window is at a maximum when said stopper is engaged with said hubs.

4. A magnetic tape cassette according to claim 1 wherein the colored flap portion of the stopper has printed characters or patterns on the visible surface thereof.

* * * * *